(12) United States Patent
Lancaster (10) Patent No.: US 7,654,018 B2
(45) Date of Patent: Feb. 2, 2010

(54) EXCAVATION APPARATUS AND METHOD (76) Inventor: Robert G. Lancaster, 218 Pierce Blvd., O'Fallon, IL (US) 62269

( * ) Notice: Subject to any disclaimer, the term of this patent is extended or adjusted under 35 U.S.C. 154(b) by 76 days.

(21) Appl. No.: 11/108,526

(22) Filed: Apr. 18, 2005

(65) Prior Publication Data
US 2006/0232084 A1 Oct. 19, 2006

(51) Int. Cl.
A01B 1/04 (2006.01)
(52) U.S. Cl. ............... 37/379; 37/405; 172/371; 294/55.5; 294/60; 254/131.5
(58) Field of Classification Search ............ 254/131.5, 254/243, 248; 37/264, 265, 379, 405; 294/55.5, 294/60; 172/371; 56/342, 400.04, 400.19
See application file for complete search history.

(56) References Cited

U.S. PATENT DOCUMENTS

| 15,628 | A | | 8/1856 | Woolson | |
|---|---|---|---|---|---|
| 462,918 | A | * | 11/1891 | Zabel | 254/131.5 |
| 584,827 | A | | 6/1897 | McIndoo | |
| 738,057 | A | | 9/1903 | O'Connor | |
| 1,494,557 | A | | 5/1924 | Lumry et al. | |
| 2,349,621 | A | | 5/1944 | Hardman | |
| 2,419,015 | A | * | 4/1947 | Gascoigne et al. | 254/131.5 |
| 2,625,370 | A | * | 1/1953 | Huggins | 254/131.5 |
| 3,061,270 | A | | 10/1962 | Lowe | |
| 3,119,596 | A | * | 1/1964 | Pratt | 254/131.5 |
| 3,288,437 | A | * | 11/1966 | Pederson | 254/132 |
| 3,976,282 | A | | 8/1976 | Baker | |
| 4,180,289 | A | | 12/1979 | Faine | |
| 4,281,866 | A | | 8/1981 | Atcheson | |
| 4,531,713 | A | * | 7/1985 | Balboni | 254/131.5 |
| 4,537,433 | A | | 8/1985 | Yang | |
| 4,663,995 | A | | 5/1987 | Amundson et al. | |
| 4,815,778 | A | | 3/1989 | Hoch | |
| D318,992 | S | | 8/1991 | Anderson | |
| 5,615,541 | A | | 4/1997 | Ota | |
| 5,669,651 | A | | 9/1997 | Vroegindewey | |
| 5,732,933 | A | | 3/1998 | Champi | |
| D398,203 | S | | 9/1998 | Naccarato et al. | |
| 5,871,058 | A | | 2/1999 | Naccarato et al. | |
| 6,076,614 | A | | 6/2000 | Gracy | |
| 6,290,211 | B1 | | 9/2001 | Pheiffer | |
| 6,505,869 | B2 | | 1/2003 | Novotny | |
| 6,663,085 | B1 | | 12/2003 | Dalon | |
| 6,758,459 | B1 | | 7/2004 | Heikkinen et al. | |
| 7,052,058 | B2 | * | 5/2006 | Olinski | 294/59 |

* cited by examiner

Primary Examiner—Gary S Hartmann

(57) ABSTRACT

An excavation tool having a lever with an end adapted for receiving force from a user's foot, an excavation head mounted to the other end of the lever, and a fulcrum mounted on the lever at the upper end of the excavation head for resting against the soil surface. The excavation tool may also have an excavation head for insertion into the soil with an upper end adapted for receiving a user's foot along the centerline of the excavation head, and a lever fixedly mounted to the excavation head, having an end adapted for receiving force from a user's foot. The excavation tool may have an opening above the upper end of the excavation head for receiving a user's foot on the upper end of the excavation head along the centerline of the excavation head. A fulcrum may be mounted on the lever at the upper end of the excavation head for resting against the soil surface.

5 Claims, 13 Drawing Sheets

FIG. 16

EXCAVATION APPARATUS AND METHOD

FIELD OF THE INVENTION

The described invention relates to an apparatus and method for efficiently excavating and cultivating soil using human power.

BACKGROUND OF THE INVENTION

Conventional human powered excavation and cultivating tools require the use of the easily strained back, shoulder and arm muscles.

SUMMARY OF THE PRESENT INVENTION

The present invention relates to a method and apparatus for efficiently excavating and cultivating soil using human power. The present invention employs an excavation head mounted to one end of a lever. The opposite end of the lever is adapted with a foot pedal to receive force applied by the user's foot. After the excavation head is inserted into the soil, the lever pivots about a fulcrum which rests against the soil surface, and which is positioned proximate the upper end of the excavation head to provide maximum mechanical advantage to initiate the excavation process by initially pivoting the excavation head about a point proximate the soil surface and the upper end of the excavation head. At the foot pedal end of the lever, force applied from the user's leg muscles and body weight produces the motion for the separating and lifting of soil portions, thus avoiding use of the more easily strained back, shoulder, and arm muscles. The excavation head is mounted to the lever to maintain a fixed angle between the longitudinal axis of the lever and the longitudinal axis of the excavation head.

The fulcrum can be configured in a variety of forms capable of resting upon the soil surface, including flat, curved or cylindrical forms or protrusions which are fixedly or pivotally mounted at the upper end of the excavation head. The fulcrum can be configured with a curved form to produce a greater separating and lifting force at the initial portion of the excavation cycle, where the pivot point is proximate the soil surface and the upper end of the excavation head, and to provide force for lifting of soil above the initial soil level during the final portion of the excavation cycle.

The apparatus may also include a handle pivotally mounted to the lever or fulcrum to facilitate operation and repositioning of the apparatus.

Additionally, in one preferred embodiment, the present invention provides an apparatus and method for repositioning the apparatus upon completion of an excavation cycle. Once the excavation head has been elevated above the soil level, the repositioning mechanism allows the tool to pivot while it is supported by one or more support legs. This pivoting capability allows the user to efficiently reposition the tool while it is supported by one or more support legs, thereby eliminating the need for the user to lift or support the entire weight of the tool to reposition it for the next excavation cycle, and thus minimizing the effort required.

The present invention also provides a method and apparatus for facilitating the discharging of excavated soil from the excavation head by rotating or pivoting the excavation head during the final portion of the excavation cycle, once the excavation head and soil portion have been elevated above the soil level.

BRIEF DESCRIPTION OF THE DRAWINGS

The invention will now be further described in conjunction with the drawings, in which.

DETAILED DESCRIPTION OF THE PREFERRED EMBODIMENT

Excavation Head. Fulcrum and Lever

Figures 1, 2, 3:
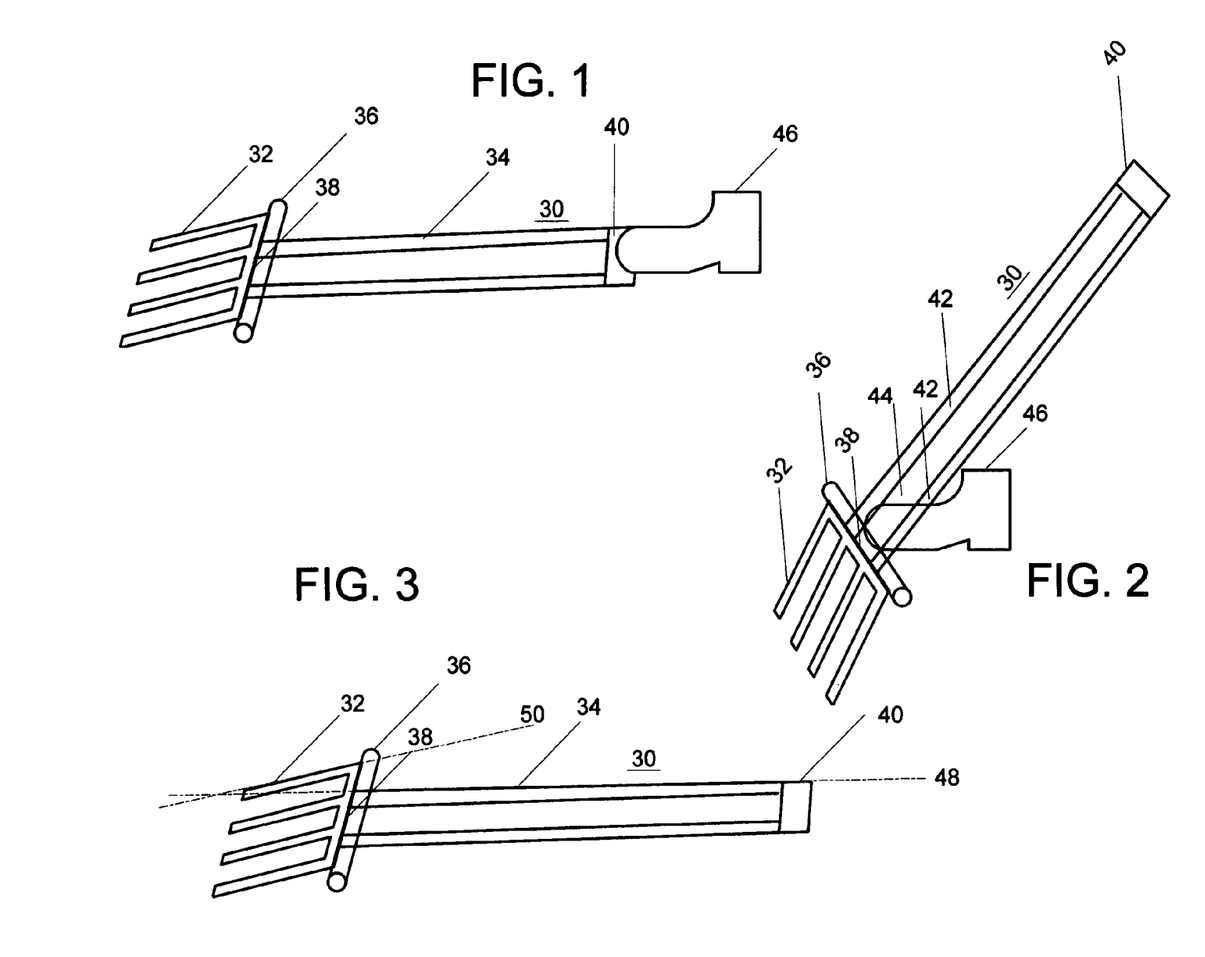
FIG. 1 is an illustration of a first preferred embodiment of the present invention.
FIG. 2 is a diagram illustrating the operation of one embodiment of the present invention.
FIG. 3 is a diagram illustrating the apparatus and method of one embodiment of the present invention.

As illustrated in FIG. 1, a first preferred embodiment of excavation tool 30 of the present invention comprises an excavation head 32, mounted to a lever 34. A fulcrum 36 is also mounted to the lever 34 near the upper end 38 of the excavation head 32. The excavation head 32 may be any type of excavating, cultivating, or other type of soil manipulating implement, such as a shovel, fork, spade, auger, blade, open tube, or hoe. The fulcrum 36 can be configured in a variety of forms capable of resting upon the soil surface, including flat, curved or cylindrical forms or protrusions which are fixedly or pivotally mounted at the upper end of the excavation head. The excavation head preferably has an upper end 38 adapted for receiving force from a user's foot over the center of the excavation head 32 for inserting the excavation head into the soil.

The opposite end of the lever 34 is configured with a foot pedal 40, to receive force applied by the user's foot 46. As is obvious to one skilled in the art, the lever, fulcrum and foot pedal can be constructed of a variety of materials capable of transferring applied forces to the excavation head, including formed metal tubes, welded or riveted sheet metal, molded polymer or plastic materials, wood, composites, and other natural and man-made materials. As shown in FIG. 2, the lever may be comprised of two separated legs 42 joined at the excavation head 32 and foot pedal 40, thus forming an opening 44 between the legs. The opening 44 is preferably of sufficient width to allow the user's foot 46 to step on the upper portion 38 of the excavation head 32, thus facilitating insertion of the excavation head 32 into the soil.

Also, as shown in FIG. 3, the excavation head 32 may be mounted to the lever 34 such that there is an angular offset between the longitudinal axis 48 of the lever and the longitudinal axis 50 of the excavation head, so that when the excavation head is in an approximately vertical inserted position, the longitudinal axis 48 of the lever will be inclined sufficiently from vertical to allow the foot pedal to be offset from directly vertically above the excavation head 32. This configuration allows the user to comfortably apply downward force to the lever 34, which is converted to rotational force exerted upon the excavation head 32 to initiate the excavation cycle.

Figure 4:
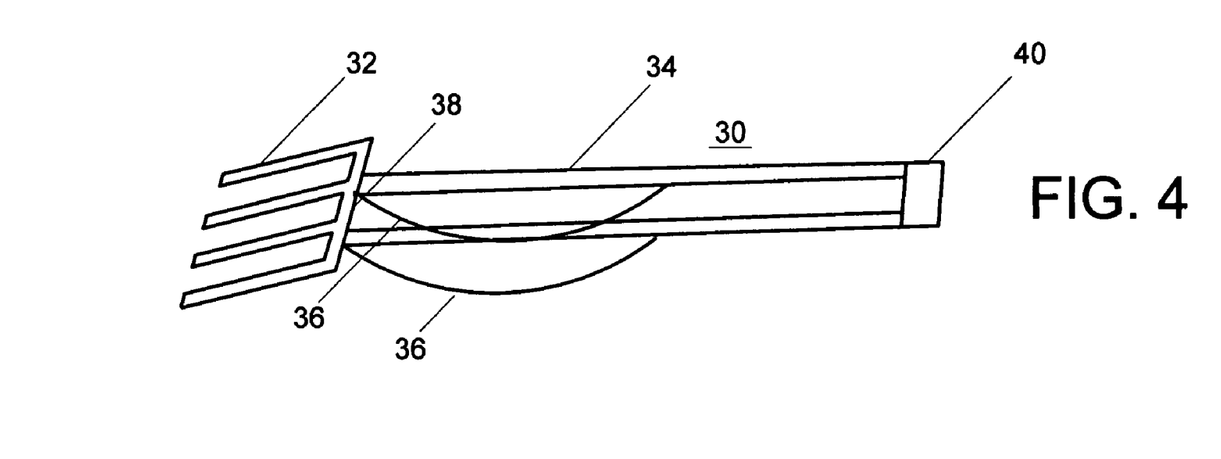
FIG. 4 is a diagram illustrating another embodiment of the present invention.
Figure 5:
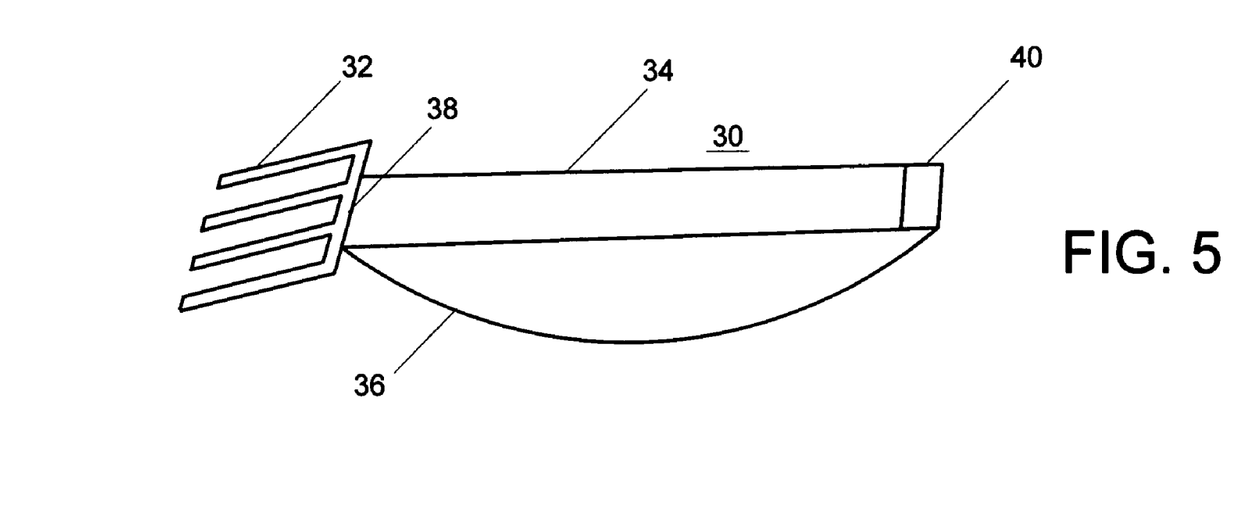
FIG. 5 is a diagram illustrating another embodiment of the present invention.

As shown in FIGS. 4 and 5, the fulcrum 36 may be configured in a variety of profiles, including one or more forms in the shape of a circular arc, elliptical segment, parabolic or other curve, other arcs, or series of line segments approximating a curve to provide the desired mechanical advantage to produce sufficient force applied to the excavation head from the force exerted by the user's foot. Additionally, the length of the lever 34 and the size and shape of the fulcrum 36 may be selected to provide the appropriate amount of mechanical advantage to accommodate a user's strength and weight, soil conditions, excavation head configuration, and excavation head size.

Figure 6:
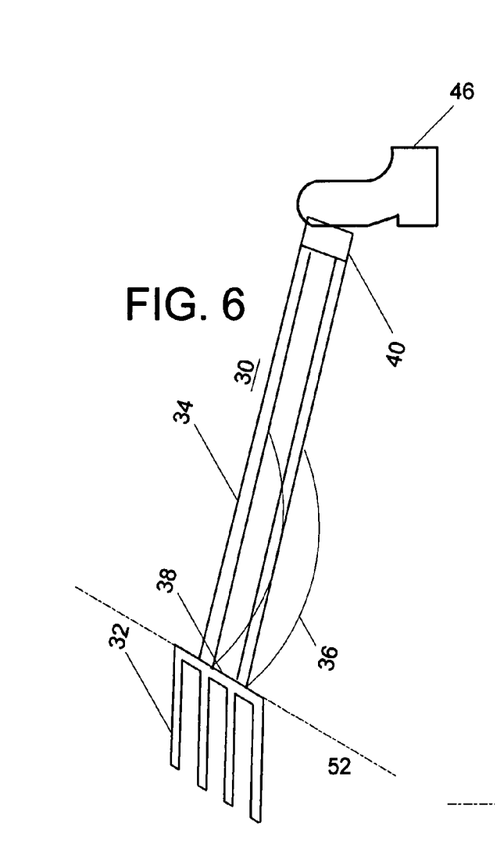
FIG. 6 is a diagram illustrating the operation of another embodiment of the present invention.

As illustrated in FIG. 6, as the user's foot 46 applies downward vertical force to the foot pedal 40, the lever 34 pivoting on the fulcrum 36 provides sufficient mechanical advantage to initiate the rotational motion of the excavation head 32 approximately about the line where the excavation head intersects the soil surface 52.

Figure 7:
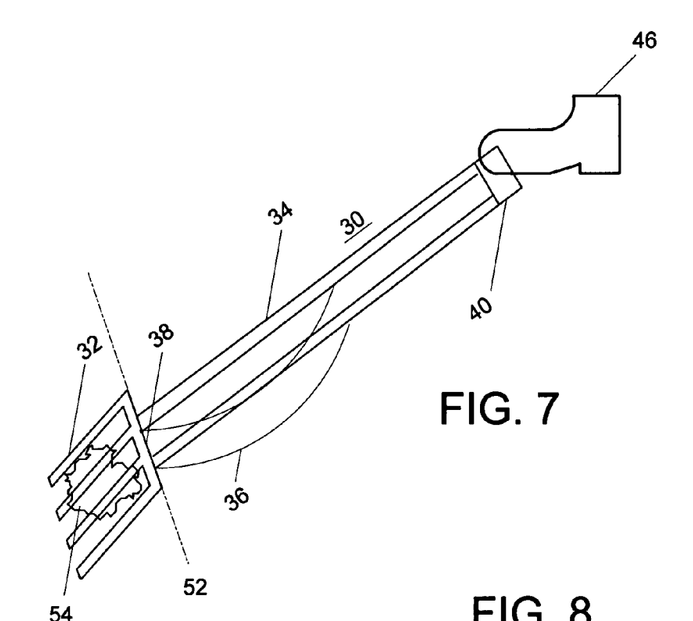
FIG. 7 is a diagram illustrating the operation of another embodiment of the present invention.
Figure 8:
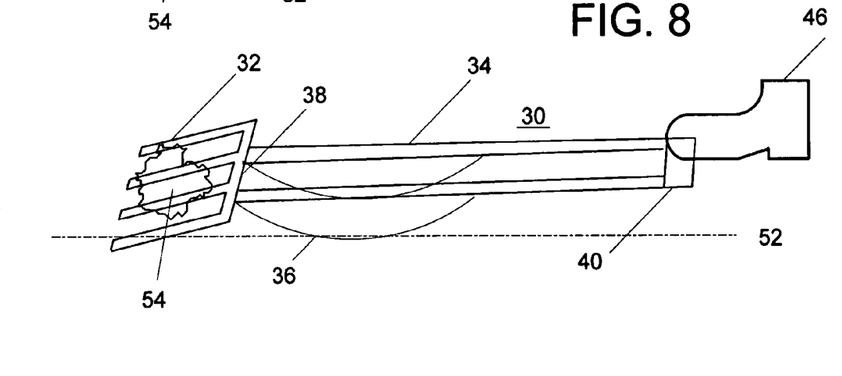
FIG. 8 is a diagram illustrating the operation of another embodiment of the present invention.

As shown in FIG. 7, as the excavation cycle proceeds, as the user's force is applied to the foot pedal 40, the lever 34 pivots about the fulcrum 36 resting against the soil surface 52, and an excavated soil portion 54 is separated from the soil. As shown in FIG. 8, as the lever 34 continues to pivot from the applied force, it moves the excavation head 32 in an increasingly upward direction, thus imparting a lifting force to the excavated soil portion 54.

Pivotally Mounted Handle

Figure 9:
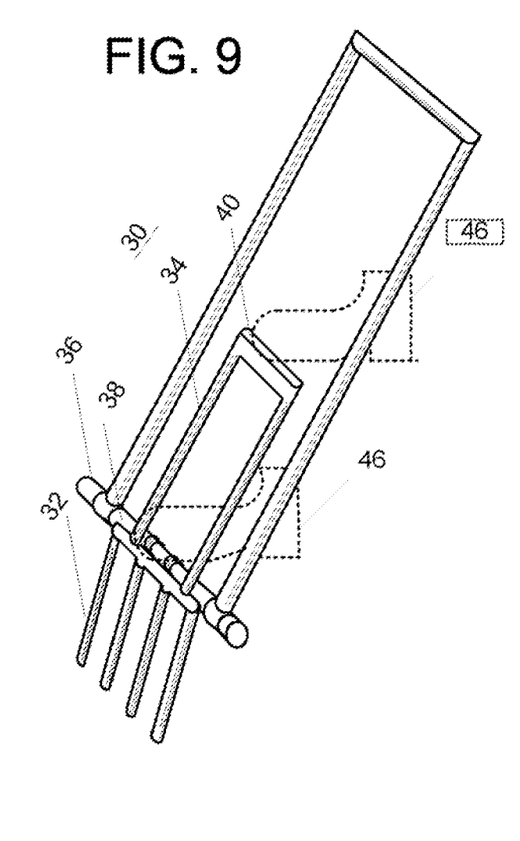
FIG. 9 is an illustration of another embodiment of the present invention.
Figures 10, 11:
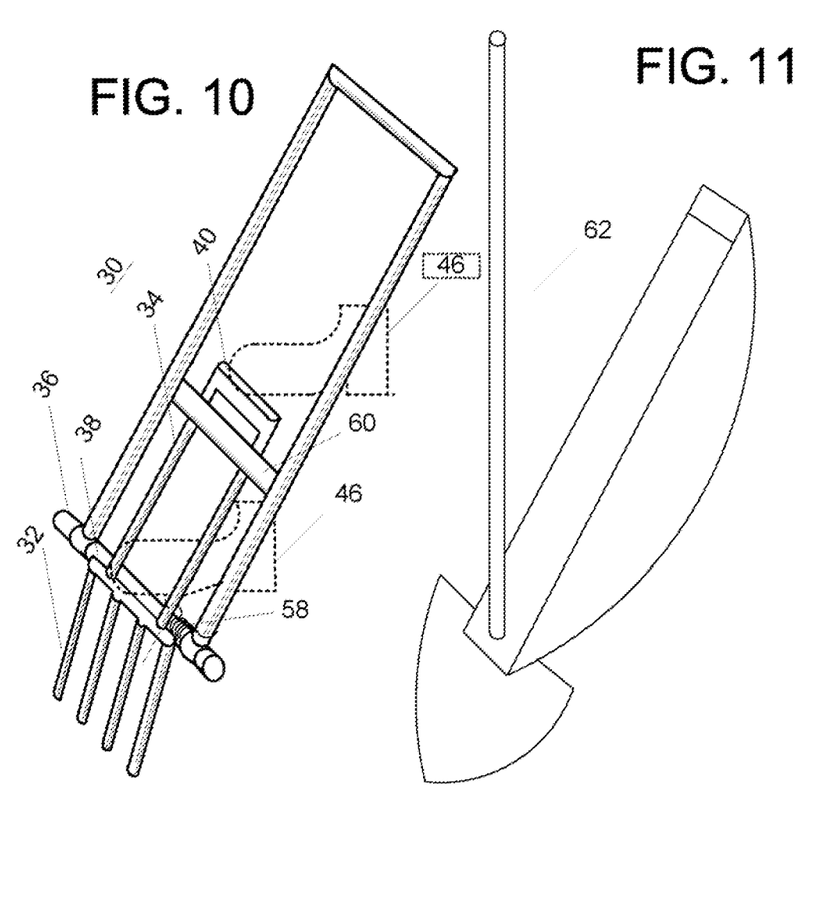
FIG. 10 is an illustration of another embodiment of the present invention.
FIG. 11 is an illustration of another embodiment of the present invention.

As illustrated in FIG. 9, another preferred embodiment comprises a handle 56 pivotally mounted to the excavation tool 30 to aid in positioning the tool. The excavation head 32 has an upper end 38 adapted for receiving force from a user's foot 46 to insert the excavation head 32 into the soil. The handle 56 can be pivotally mounted to the fulcrum 36, lever 34, or the upper portion 38 of the excavation head 32, using pins, bearings, hinges, bushings or other pivotal mounting methods used in the art. As illustrated in FIG. 9, the handle 56 may comprise two legs which allow the lever to pivot between the legs. Also, as illustrated in FIG. 9, the configuration of the upper surface 38 of the excavation head 32 allows the user's foot 46 to be placed over the center of the excavation head 32, thus allowing the user's weight to insert the excavation head 32 into the soil. Once the excavation head 32 is inserted, the fulcrum 36 rests upon the soil surface, and the user may step on the foot pedal 40 end of the lever 34, which raises the excavation head 32 out of the soil and excavates a soil portion. Although the weight of the excavation head may cause the tool to rest in an orientation with the foot pedal in an upright orientation when the tool is removed from the soil for repositioning or transporting, this orientation can also be achieved through use of a spring bias and/or means for selectively securing the tool to the handle. As shown in FIG. 10, a coil spring 58 may be used to return the lever 34 to an upright orientation in relation to the handle 56. Also as shown in FIG. 10, a crossbar 60 or other component within the pivoting arc of the lever 34 can be used to limit the return motion of the lever 34. The crossbar 60 or a locking mechanism, such as sliding pins or a latch, to selectively connect the handle of the lever 34 to allow direct rotation of the lever 34 in a downward direction by movement of the handle to impart an initial pivoting force to the lever 34 after insertion of the excavation head into the soil surface. This force can facilitate pivoting the lever into position for application of force from the user's foot 46 to the foot pedal 40.

Existing Handled Tool

As shown in FIG. 11, the lever and fulcrum may be configured to attach to an excavation head on a conventional handled excavation tool 62, such as a shovel, trowel, fork, or spade. The attachment means may include any number of mechanisms for maintaining a fixed angular relationship between the longitudinal axis of the lever and the longitudinal axis of the excavation head, such as an opening in the lever or fulcrum to accommodate the handle as illustrated in FIG. 11. As can be appreciated by one skilled in the art, other means of attachment can be used, including clamps, hooks, bolts, screws, cables, and combinations thereof.

Foot Peg

Figure 12:
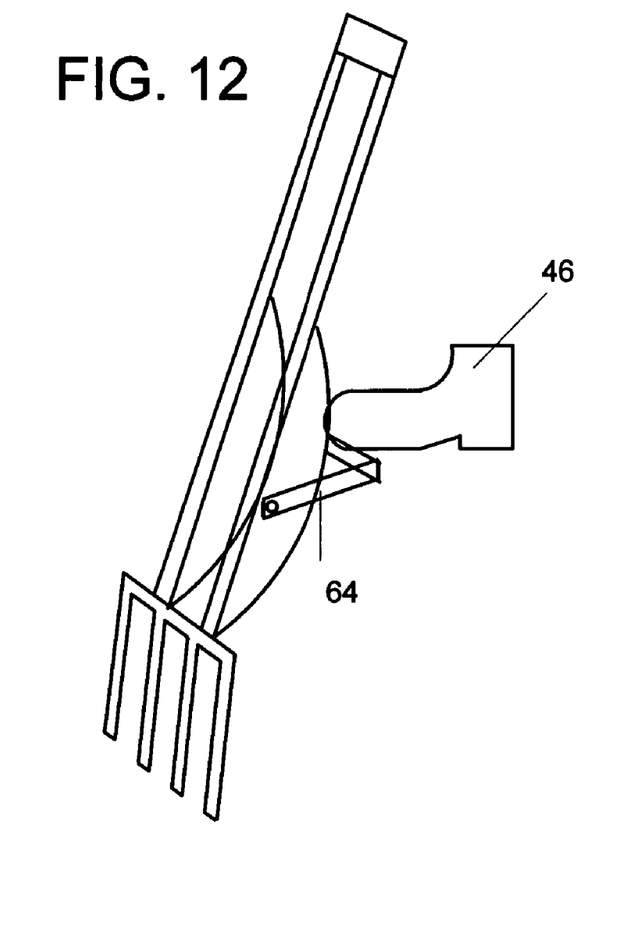
FIG. 12 is a diagram illustrating the detail of a foot peg of another embodiment of the present invention.

As illustrated in FIG. 12, the lever 34 or the fulcrum 36 may be configured to include a pivoting foot peg 64 to receive applied force from the user's foot 46 to facilitate insertion of the excavation head 32 into the soil surface.

Figure 13:
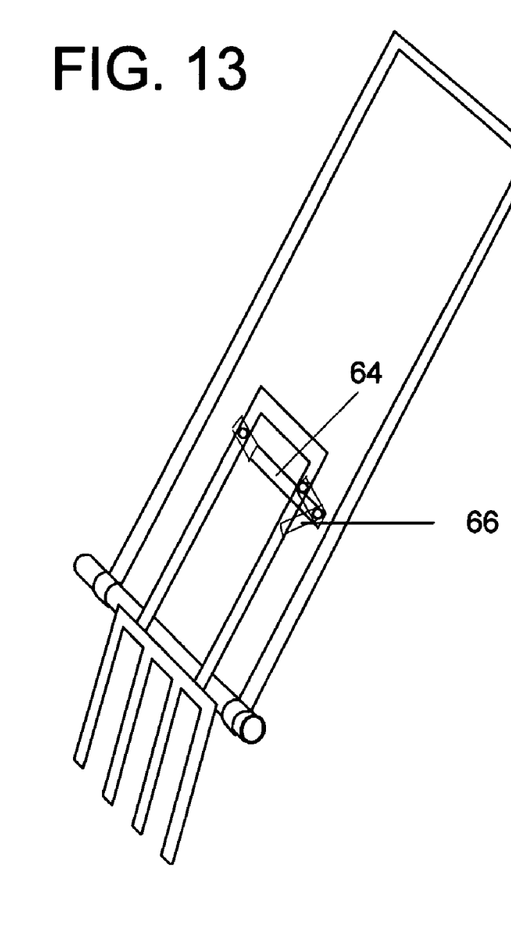
FIG. 13 is a diagram illustrating the detail of a foot peg of another embodiment of the present invention.

The foot peg 64 can be positioned offset from the axis of the lever 34 to provide additional leverage to rotate the excavation head 32 about the fulcrum 36. As shown in FIG. 13, the foot peg 64 may be retained in position by pivoting supports 66 which rest against the lever and are maintained in position by gravity while the lever is in a nearly vertical position. Then, as the lever approaches the soil surface, the supports 66 pivot (fold) flat against the foot peg 64 to allow the lever 34 to be pivoted throughout the excavation cycle into contact the soil surface.

Repositioning Mechanism

Figure 14A:
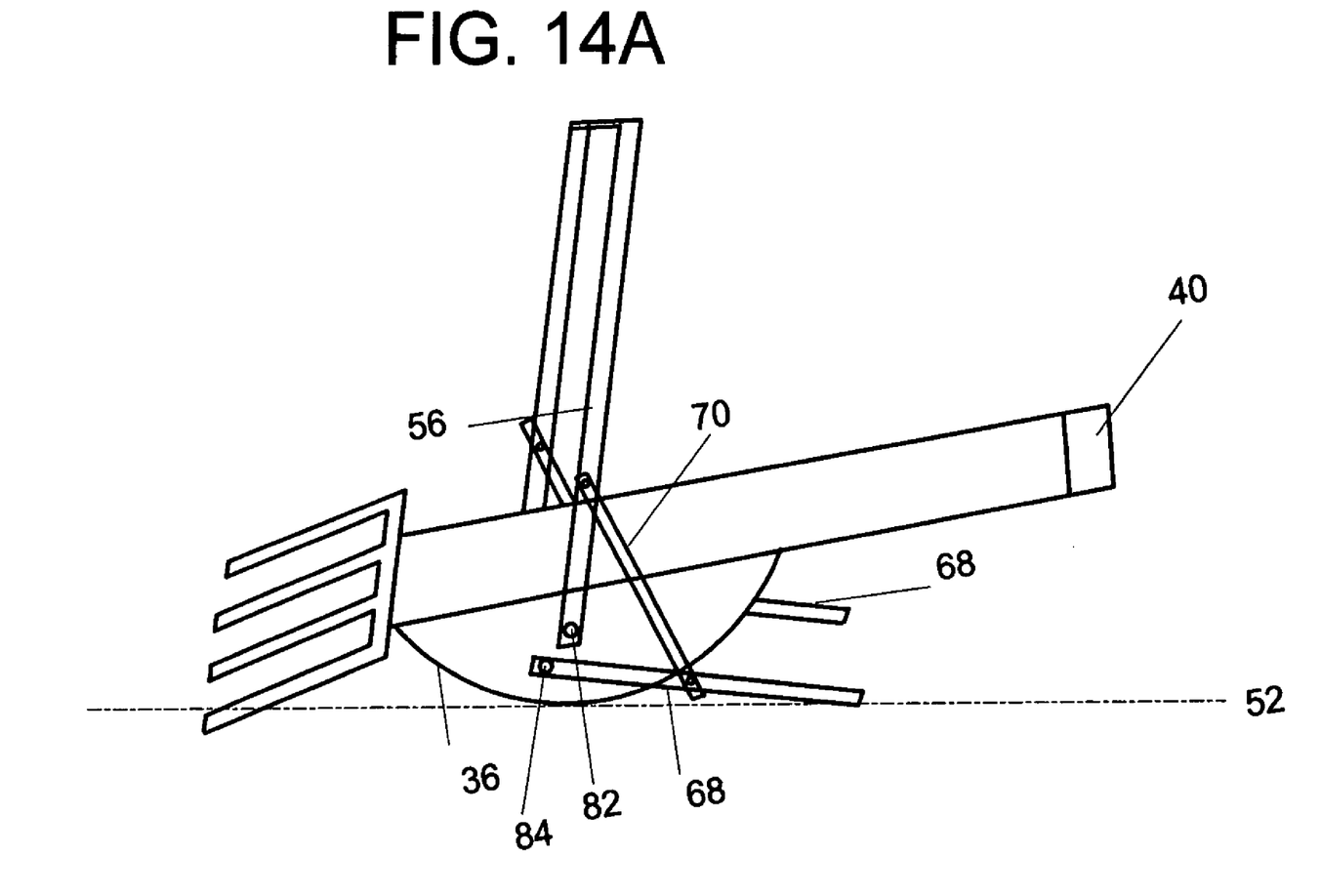
FIG. 14A is an illustration of another embodiment of the present invention.
Figure 14B:
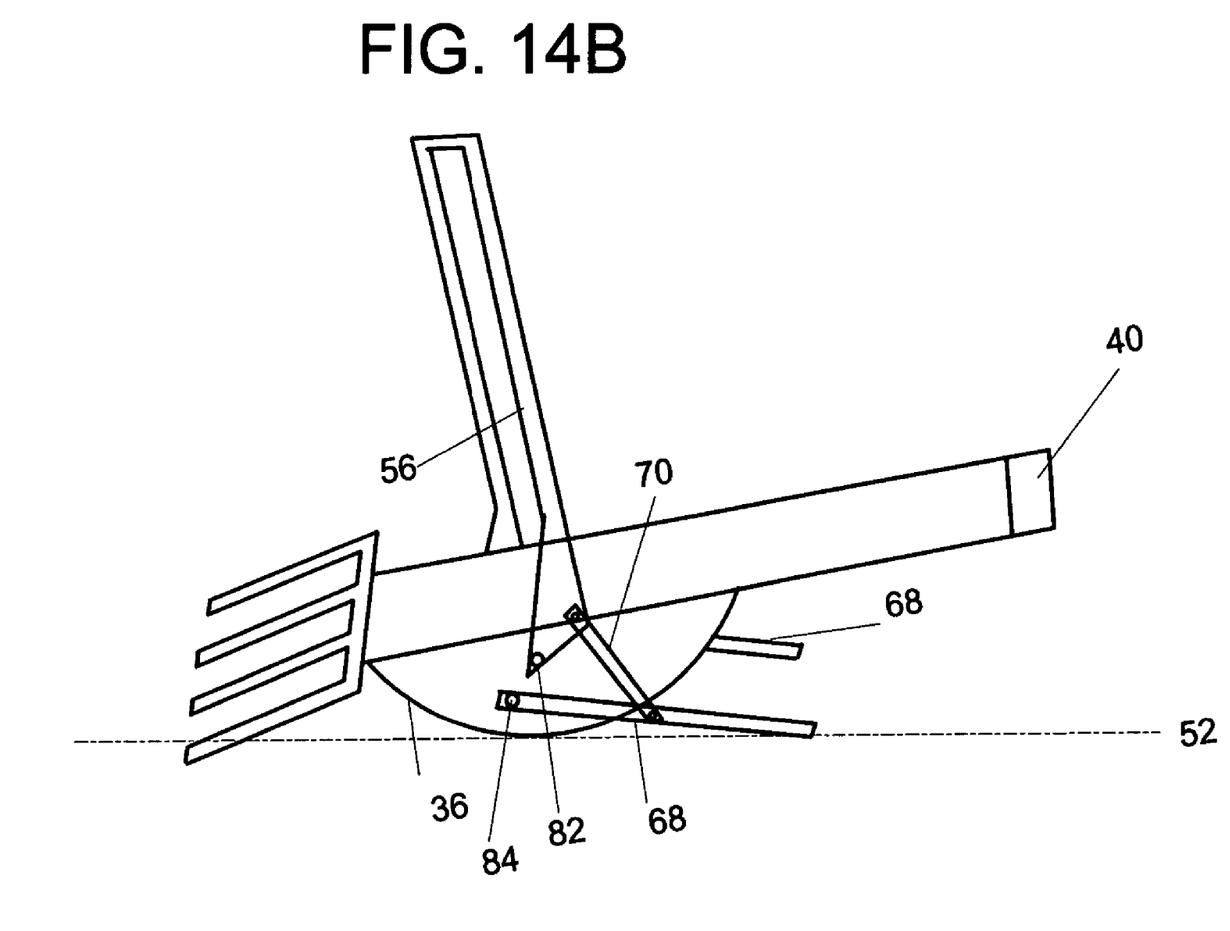
FIG. 14B is an illustration of another embodiment of the present invention.

Another preferred embodiment of the present invention incorporates a repositioning mechanism to facilitate insertion of the excavation tool into an unexcavated area of soil upon completion of the excavation cycle. As shown in FIG. 14A, the repositioning mechanism comprises a handle 56 pivotally mounted to a pivot point 82 on the fulcrum or lever, and a pair of support legs 68, which are pivotally mounted to another point 84 on the fulcrum or lever, such that the handle pivot point 82 is closer to the excavation head than the support leg pivot point 84 and such that the support leg pivot point 84 is closer to the longitudinal axis of the lever than is the handle pivot point 82. The handle is linked to the support legs 68 by repositioning links 70, which are rigid members that are pivotally connected to the handle 56 and the support legs 68. Thus, as the handle is pulled towards the foot pedal 40, it causes downward rotation of the support legs 68, and rotation of the lever in the opposite direction. As can be appreciated by one skilled in the art, this mechanism may be configured using a variety of levers, cables, push rods, gears, etc. Another preferred embodiment having a different configuration of handle 56 is illustrated in FIG. 14B.

Figure 15:
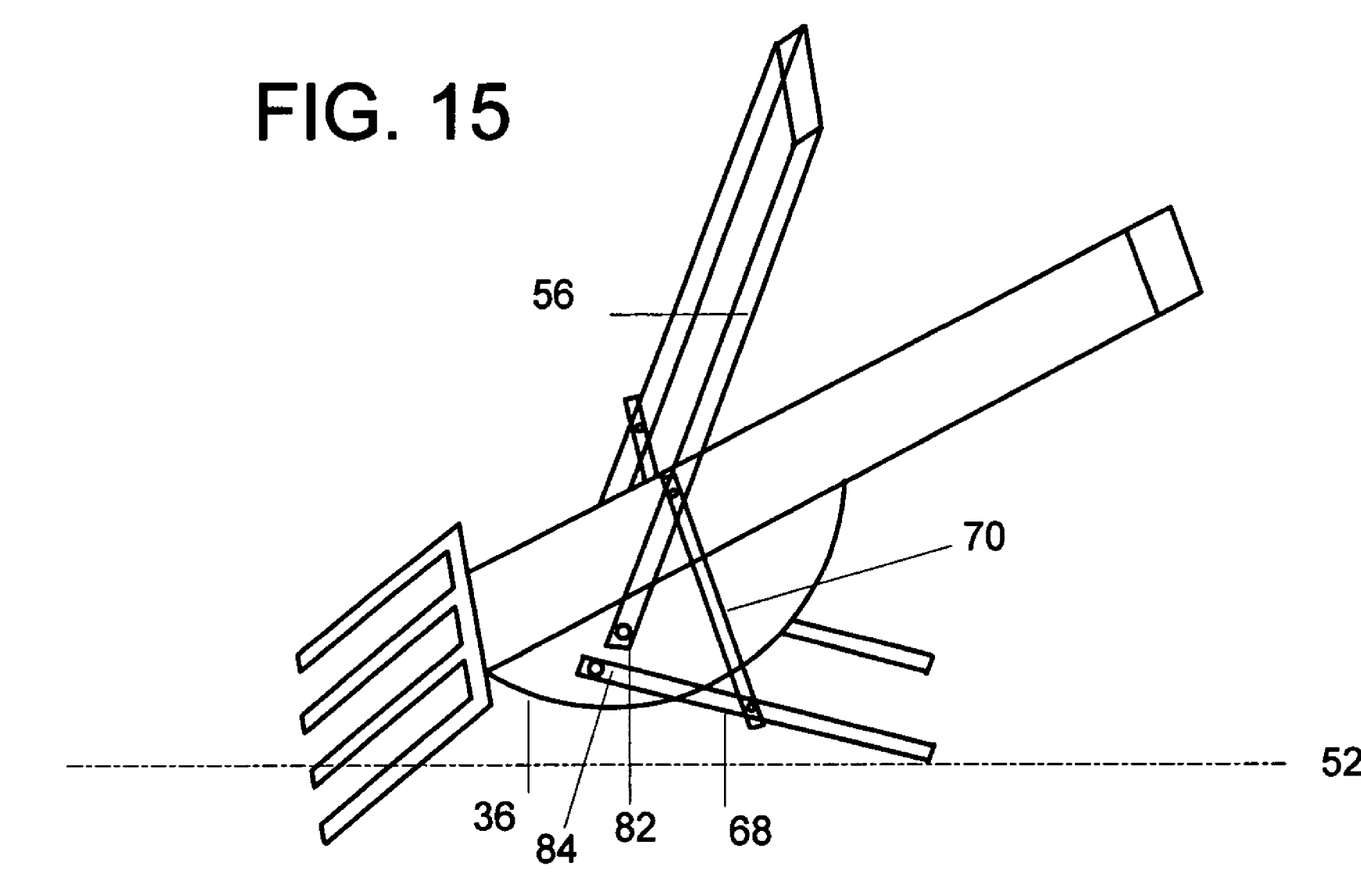
FIG. 15 is a diagram illustrating the operation of another embodiment of the present invention.

Once the excavation cycle is complete, the longitudinal axis of the excavation head approaches a horizontal orientation, and the user's foot comes to a rest on the foot pedal against the soil surface. At this point, the user may pull the handle toward the foot pedal, thus lowering the support legs 68 beneath the fulcrum and into contact with the soil surface 52. As shown in FIG. 15, the support legs thus support the lever, fulcrum and the excavation head, and begin lifting the foot pedal end of the lever to a greater elevation above the soil surface. As the handle is further pulled toward the foot pedal, the foot pedal end of the lever is rotated in an upward and forward direction, thus rotating the longitudinal axis of the lever into a nearly vertical orientation, and positioning the lower entry portion of the excavation head in contact with the soil surface at a desired distance from the void created by removal of the previous soil portion. As can be appreciated by one skilled in the art, the repositioning cycle distance may be adjusted by altering the configuration of the repositioning links and the location of the pivot points of the handle and support legs.

Figure 16:
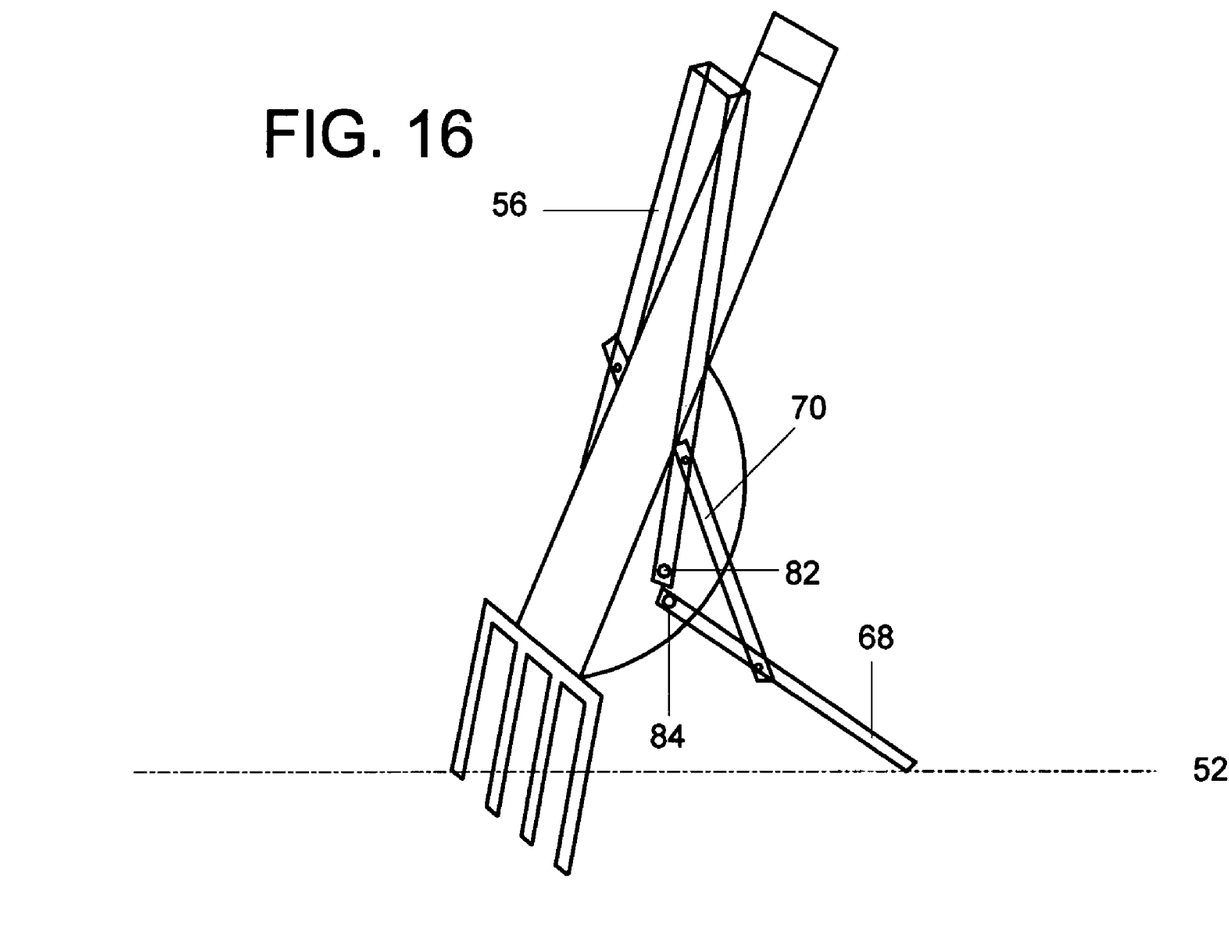
FIG. 16 is a diagram illustrating the operation of another embodiment of the present invention.

As shown in FIG. 16, once the longitudinal axis of the excavation head is approximately vertical, the user may insert the excavation head into the soil by applying the user's foot to the upper portion 38 of the excavation head or to foot peg 64, incorporated into the lever or fulcrum. Once the excavation head is inserted to the appropriate depth in the soil, a new excavation cycle can be initiated by applying the user's foot to the foot pedal 40 and the cycle can be repeated for further excavation.

The handle 56 may also be configured with a locking mechanism, such as sliding pins or a latch, to selectively connect to the lever or fulcrum to allow direct rotation of the lever in a forward direction by movement of the handle to reposition the lever such that the excavation head is in a nearly vertical orientation in contact with the soil surface.

Interchangeable Excavation Heads

Figure 17:
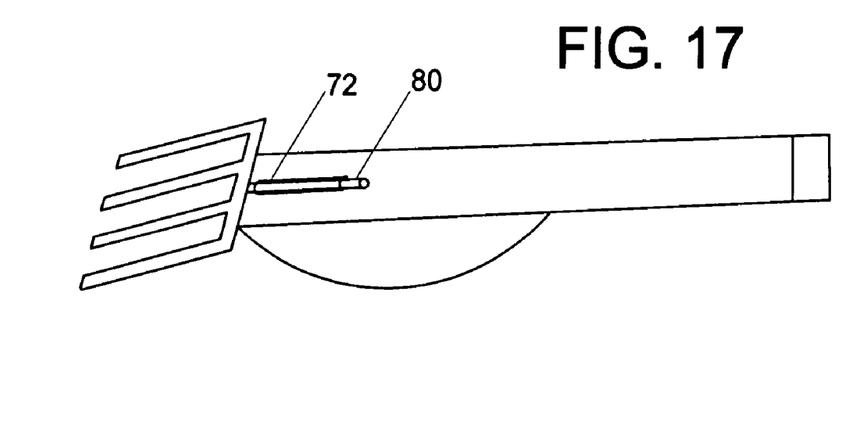
FIG. 17 is a diagram illustrating another embodiment of the present invention which accommodates interchangeable excavation heads.

Another preferred embodiment incorporates a mount for the excavation head that permits the use of multiple interchangeable excavation heads. As illustrated in FIG. 17, the excavation head mount 72 may be configured to readily accommodate any one of a number of interchangeable excavation heads. These interchangeable excavation heads can be configured using a common cylindrical shaft 80 for insertion into an accommodating tubular opening in the mount 72, as illustrated, or a common bolt or hole pattern, which allows for securing any of the excavation heads to the mount using one or more bolts or pins or other fastening means.

Pivotal or Rotational Mount

Figure 18:
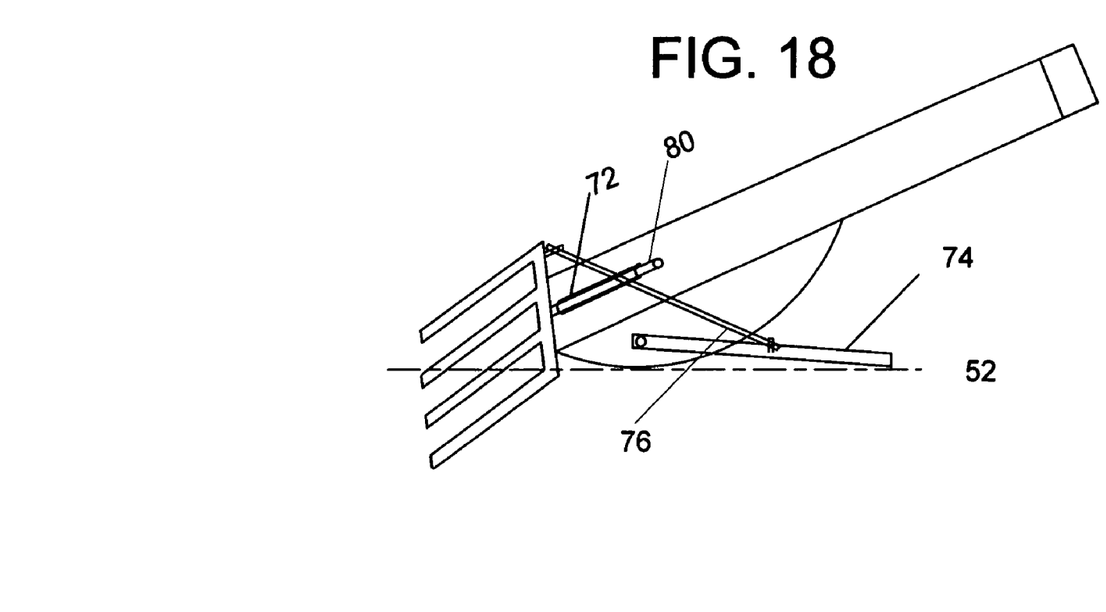
FIG. 18 is a diagram illustrating the rotational excavation head mount of another embodiment of the present invention.
Figure 19:
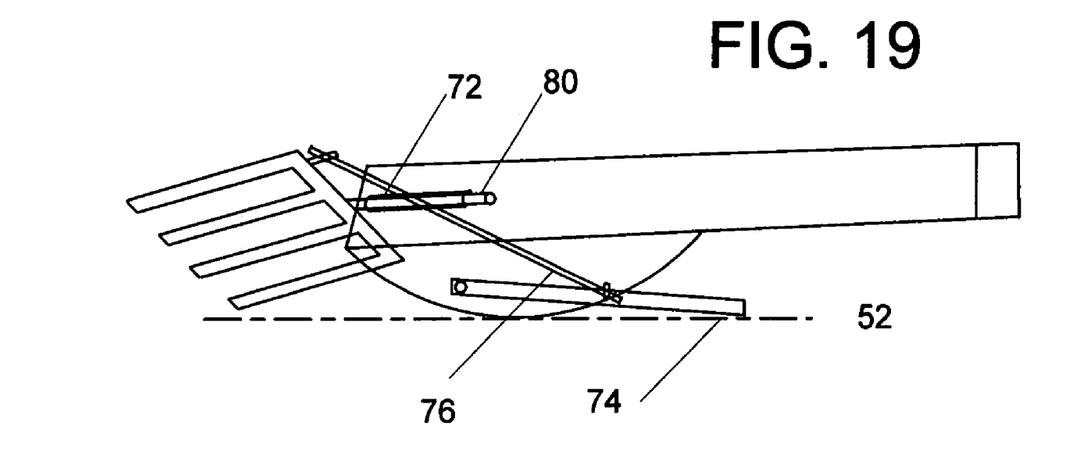
FIG. 19 is a diagram illustrating the operation of a rotational excavation head mount of another embodiment of the present invention.

The discharge of the excavated soil from the excavation head may be facilitated by the pivotal or rotational mounting of the excavation head to the lever and the incorporation of a mechanism to pivot or rotate the excavation head about its longitudinal axis when the excavation head is above the soil level and near the completion of the excavation cycle. A preferred embodiment incorporating this aspect of the invention is illustrated in FIG. 18. As illustrated in FIG. 18, the excavation head is mounted on a cylindrical shaft 80, which is inserted into a tubular mount 72 with sufficient clearance to permit the excavation head to rotate freely. This rotational mounting can also be accomplished with a hinge. As shown in FIG. 19, as the excavation head approaches a horizontal orientation, the release lever 74, which is pivotally mounted to the lever or fulcrum and connected to the excavation head by a push rod 76, receives a pivoting force from its contact with the soil surface 52, thus imparting a sideways rotational or pivoting force to the excavation head mount 72, thus releasing the excavated soil and discharging it to the side of the void created by its removal from the soil. As can be appreciated by one skilled in the art, this linkage may be configured using a variety of mechanisms, including levers, cables, push rods, gears, etc.

Canted Excavation Head

Figure 20:
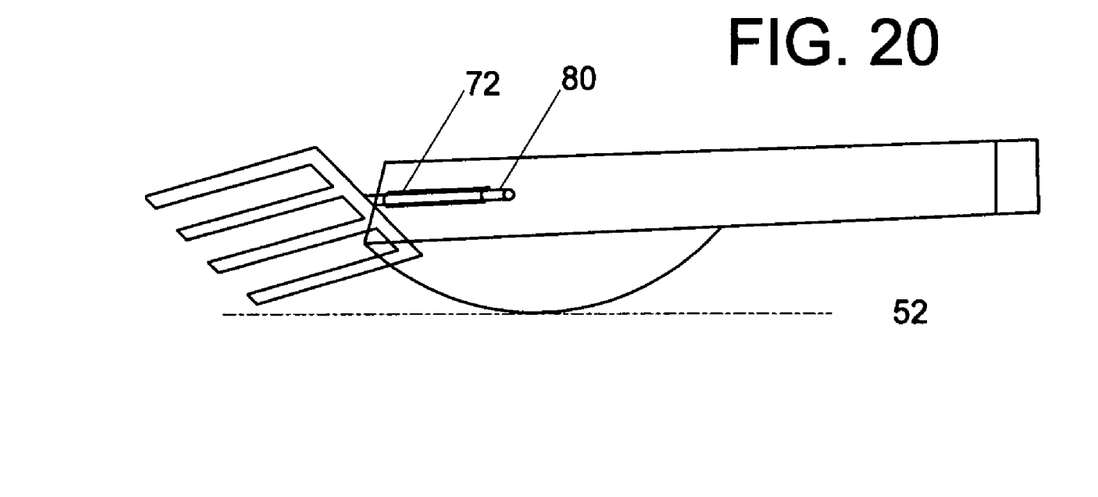
FIG. 20 is a diagram illustrating another embodiment of the present invention with an excavation head with a fixed canting angle.

Another preferred embodiment of the present invention incorporates an excavation head that is canted from the plane of motion of the lever. This canted orientation facilitates the discharge of excavated soil from the excavation head as the excavation head is raised by the operation of the lever and fulcrum. As may be appreciated by those of ordinary skill in the art, the extent of canting of the excavation head may range from 0°-90° from the plane of the lever motion. In FIG. 20, an excavation head with a fixed canting angle of approximately 45° is illustrated.

Another preferred embodiment provides an adjustably canted mount for the excavation head that permits the excavation head to rotate about its longitudinal axis to a selected canted position. This allows the user to select a desired canting angle from a plurality of predetermined positions, or alternatively, by a mechanism which allows the user to lock the excavation head at any position within a range of rotation. As can be appreciated by one skilled in the art, this mechanism may be configured using a variety of locking mechanisms, including pins, bolts, gears, etc.

Rotationally Inserted Excavation Head

Figures 21, 22:
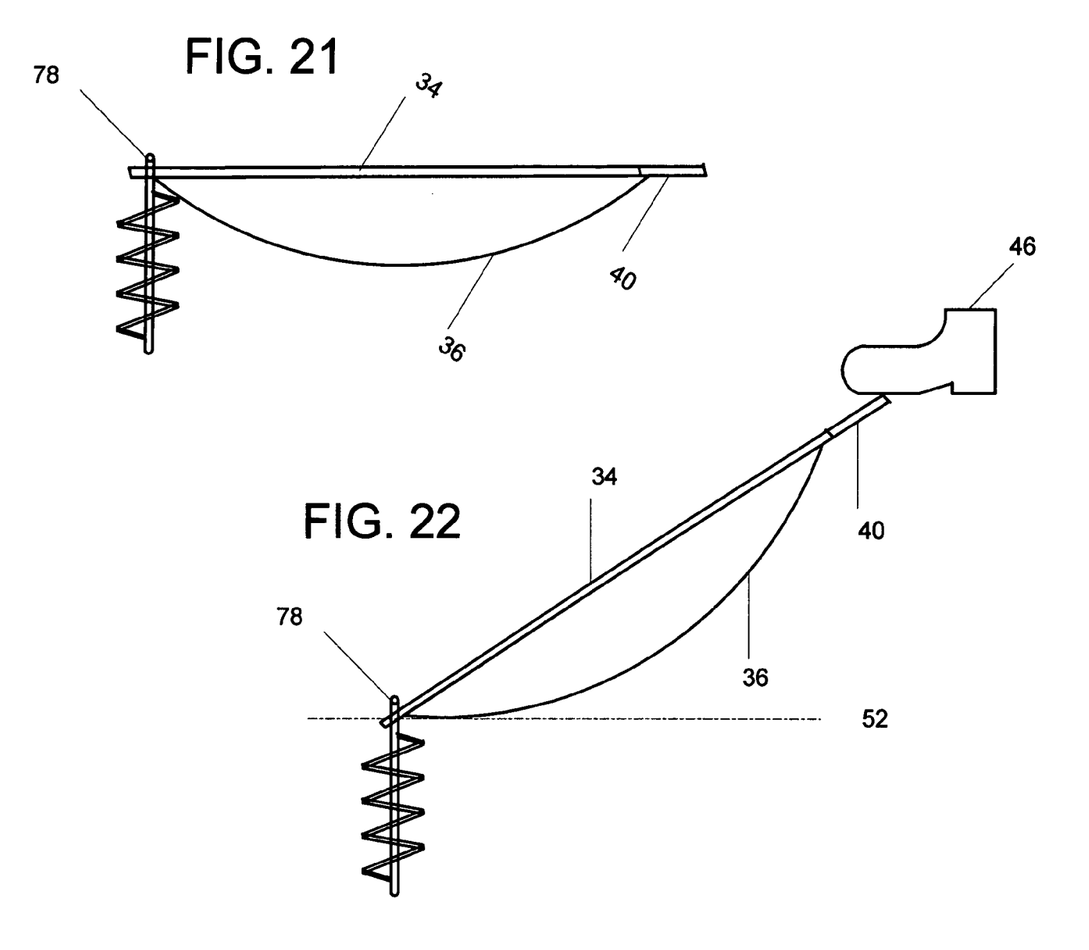
FIG. 21 is a diagram illustrating the apparatus and method of one embodiment of the present invention having a rotationally inserted excavation head.
FIG. 22 is a diagram illustrating the operation of an embodiment of the present invention having an excavation head, which is rotationally inserted into soil.
Figure 23:
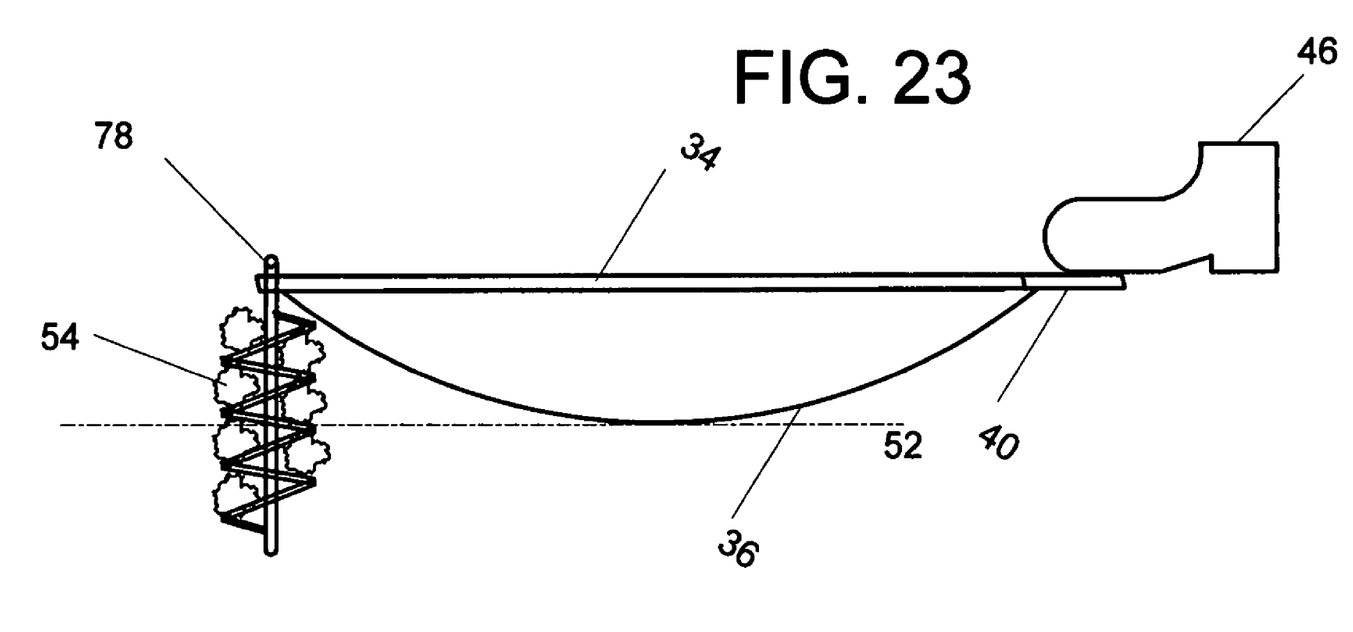
FIG. 23 is a diagram illustrating the operation of an embodiment of the present invention having a rotationally inserted excavation head.

Another preferred embodiment of the present invention incorporates a rotationally inserted excavation head, such as a threaded auger 78, which is raised vertically in operation to remove soil. The excavation head is rotationally and pivotally mounted to the lever 34 to allow rotation of the excavation head 78 for insertion into the soil, and pivotally mounted to allow a constant vertical orientation of the auger's longitudinal axis during removal, while the lever pivots. As illustrated in FIG. 21, an auger 78 is pivotally mounted to the lever using a connection which also allows rotation of the auger to permit insertion into the soil surface 52 by rotation of the auger threads. As the auger is inserted into the soil, it draws the lever 34 and fulcrum 36 into contact with the soil surface 52, as illustrated in FIG. 22. Next, as illustrated in FIG. 23, the user's foot 46 is applied to the foot pedal 40 to raise the auger 78 and soil portions 54 above the soil surface 52. As can be appreciated by one skilled in the art, this mechanism may be configured using a variety of excavation heads which can be vertically extracted from the soil.

In one aspect, the present invention comprises an excavation tool having a lever, having an end adapted for receiving force from a user's foot, an excavation head mounted to the other end of the lever, and a fulcrum mounted on the lever at the upper end of the excavation head for resting against the soil surface.

In another aspect, the present invention comprises an excavation tool having an excavation head with an upper end for receiving a user's foot along the centerline of the excavation head, a lever fixedly mounted to the excavation head, having an end adapted for receiving force from a user's foot, and having an opening above the upper end of the excavation head for receiving a user's foot on the upper end of the excavation head along the centerline of the excavation head, a fulcrum mounted on the lever at the upper end of the excavation head for resting against the soil surface, and a handle pivotally mounted to the fulcrum having two legs which are separated to allow the lever to pivot between the handle legs.

While preferred embodiments of the invention and preferred methods of practicing the same have been shown and described herein, persons of ordinary skill in the art will recognize and appreciate that the invention encompasses and includes numerous modifications and variations thereto without departing from the spirit and scope of the present invention. In addition, it should be understood, and persons of ordinary skill in the art will recognize, that aspects of the various preferred embodiments discussed herein may be interchanged or eliminated, both in whole or in part. Furthermore, those of ordinary skill in the art will appreciate the foregoing description is by way of example only, and does not and is not intended to limit the scope, nature and/or variations of the invention.

What is claimed is:

1. A tool for excavating soil, comprising:
    a lever having an upper end adapted for receiving force from a user's foot,
    an excavation head for insertion into the soil mounted to the lower end of the lever, the lever having an opening between the upper end and the excavation head for receiving a user's foot, and a
    handle pivotally mounted to the lever.

2. The tool of claim 1 wherein the opening is along the centerline of the lever.

3. The tool of claim 1 wherein the handle is mounted to the lever between the upper end and the excavation head.

4. The tool of claim 3 wherein the handle comprises two legs which are separated to allow the lever to pivot between the handle legs.

5. The tool of claim 4 wherein the handle legs are connected by a crossbar within the pivot arc of the lever.

* * * * *